US008042766B2

(12) United States Patent
Steinke et al.

(10) Patent No.: US 8,042,766 B2
(45) Date of Patent: Oct. 25, 2011

(54) HYBRID AIRCRAFT WHEEL COMPRISING METAL AND COMPOSITE PORTIONS

(75) Inventors: Douglas J. Steinke, South Bend, IN (US); Allen H. Simpson, Buchanan, MI (US); James F. Stevenson, Morristown, NJ (US); Manuel G. Koucouthakis, Granger, IN (US); Richard L. Bye, Morristown, NJ (US)

(73) Assignee: Honeywell International Inc., Morristown, NJ (US)

( * ) Notice: Subject to any disclaimer, the term of this patent is extended or adjusted under 35 U.S.C. 154(b) by 639 days.

(21) Appl. No.: 12/216,542

(22) Filed: Jul. 7, 2008

(65) Prior Publication Data

US 2010/0001130 A1 Jan. 7, 2010

(51) Int. Cl.
*B64C 25/36* (2006.01)
*B60B 5/02* (2006.01)

(52) U.S. Cl. ........... 244/103 R; 301/64.702; 301/95.102
(58) Field of Classification Search ............... 244/103 R, 244/104 R; 301/64.702, 64.703, 95.11, 95.102
See application file for complete search history.

(56) References Cited

U.S. PATENT DOCUMENTS

| 4,244,413 | A | * | 1/1981 | Takahashi et al. ............ 152/323 |
| 5,080,444 | A | * | 1/1992 | Hopkins et al. ........... 301/95.107 |
| 5,985,072 | A | * | 11/1999 | Finck et al. .................... 156/184 |
| 7,066,228 | B2 | | 6/2006 | Grimberg et al. |
| 7,377,596 | B2 | * | 5/2008 | Steinke et al. ........... 301/64.703 |

* cited by examiner

*Primary Examiner* — Rob Swiatek
(74) *Attorney, Agent, or Firm* — Shumaker & Sieffert, P.A.

(57) ABSTRACT

An aircraft wheel (14) comprises a metal support structure (30) having a first annular ring (31) and a second annular ring (32) connected via at least one connecting element (37); and a fiber-enforced, molded-composite body. The metal support structure (30) is at least partially embedded in the composite body to form a first aircraft wheel section (20, 22) having a rim flange (16a, 16b) for forming a seal with a tire.

20 Claims, 3 Drawing Sheets

HYBRID AIRCRAFT WHEEL COMPRISING METAL AND COMPOSITE PORTIONS

FIELD OF THE INVENTION

The present invention is related to a wheel having metal and composite portions, and, more specifically, to an aircraft wheel having at least one metal structural member that is at least partially embedded in a body of composite material.

BACKGROUND OF THE INVENTION

Aircraft weight affects fuel efficiency and limits the mass of cargo and passengers that can be carried. It is therefore generally desirable to reduce the weight of aircraft components to increase fuel efficiency and/or load capacity of an aircraft. One method of reducing aircraft weight is to form various components from lighter weight materials. One material useful for some weight reduction applications comprises a composite resin that may be reinforced with carbon or other fibers. However, various factors, including strength requirements, appearance, and the conditions to which the components are subjected, limit the materials that can be used for certain applications. In some cases, substituting a composite material for a metallic element will require a change to the size, shape or construction of the element being replaced. It is generally not possible to reduce aircraft weight merely by replacing every metallic element in the aircraft with an identical composite member.

Aircraft wheels are generally made from aluminum or metal alloys. Wheels are subjected to significant stresses, especially when an aircraft lands and when brakes are applied to rapidly decelerate the aircraft. In light of these stresses, aircraft wheels are examples of metallic parts that cannot easily be replaced with composite elements. It would therefore be desirable to provide an aircraft wheel that achieves weight reduction through the use of composite materials.

SUMMARY OF THE INVENTION

These problems and others are addressed by embodiments of the present invention, a first aspect of which is directed to an aircraft wheel comprising: a metal support structure having a first annular ring and a second annular ring connected via at least one connecting element; and a fiber-enforced, molded-composite body, wherein the metal support structure is at least partially embedded in the composite body to form a first aircraft wheel section having a rim flange for forming a seal with a tire. Another aspect of the present invention is directed to a method of manufacturing an aircraft wheel comprising: providing a metal support structure having a first annular ring and a second annular ring connected via at least one connecting element; and embedding, at least partially, the metal support structure in a fiber-enforced, molded-composite body to form a first aircraft wheel section having a rim flange for forming a seal with a tire.

BRIEF DESCRIPTION OF THE DRAWINGS

These aspects and features of the invention and others will be better understood after a reading of the following detailed description together with the attached drawings wherein.

DETAILED DESCRIPTION

Figure 1:
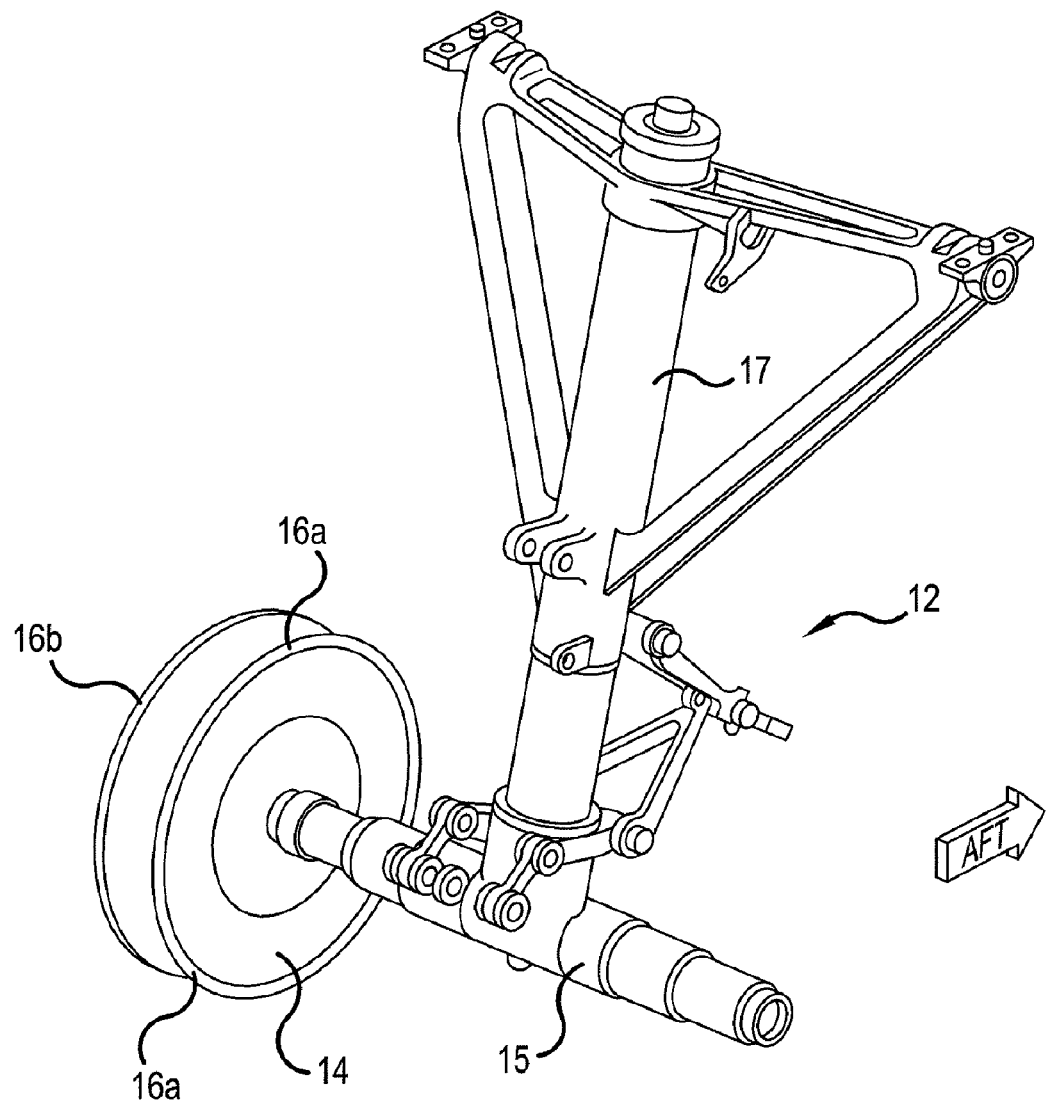
FIG. 1 is a perspective view of a portion of an aircraft landing gear component including a strut and a metal and composite wheel according to an embodiment of the present invention.

Referring now to the drawings, wherein the showings are for purposes of illustrating embodiments of the invention only and not for the purpose of limiting same, FIG. 1 illustrates a landing gear system 12 for an aircraft. Landing gear system 12 includes first and second wheels 14, only one of which is shown, an axle 15 connecting the wheels 14, and a strut 17 connecting the axle 15 and hence the wheels 14, to the aircraft. Wheel 14 is illustrated in FIG. 1 without a tire; however a tire would normally be mounted on the wheel. Wheel 14 includes first and second rim flange regions 16a, 16b with which the tire can make an airtight seal.

Figure 2:
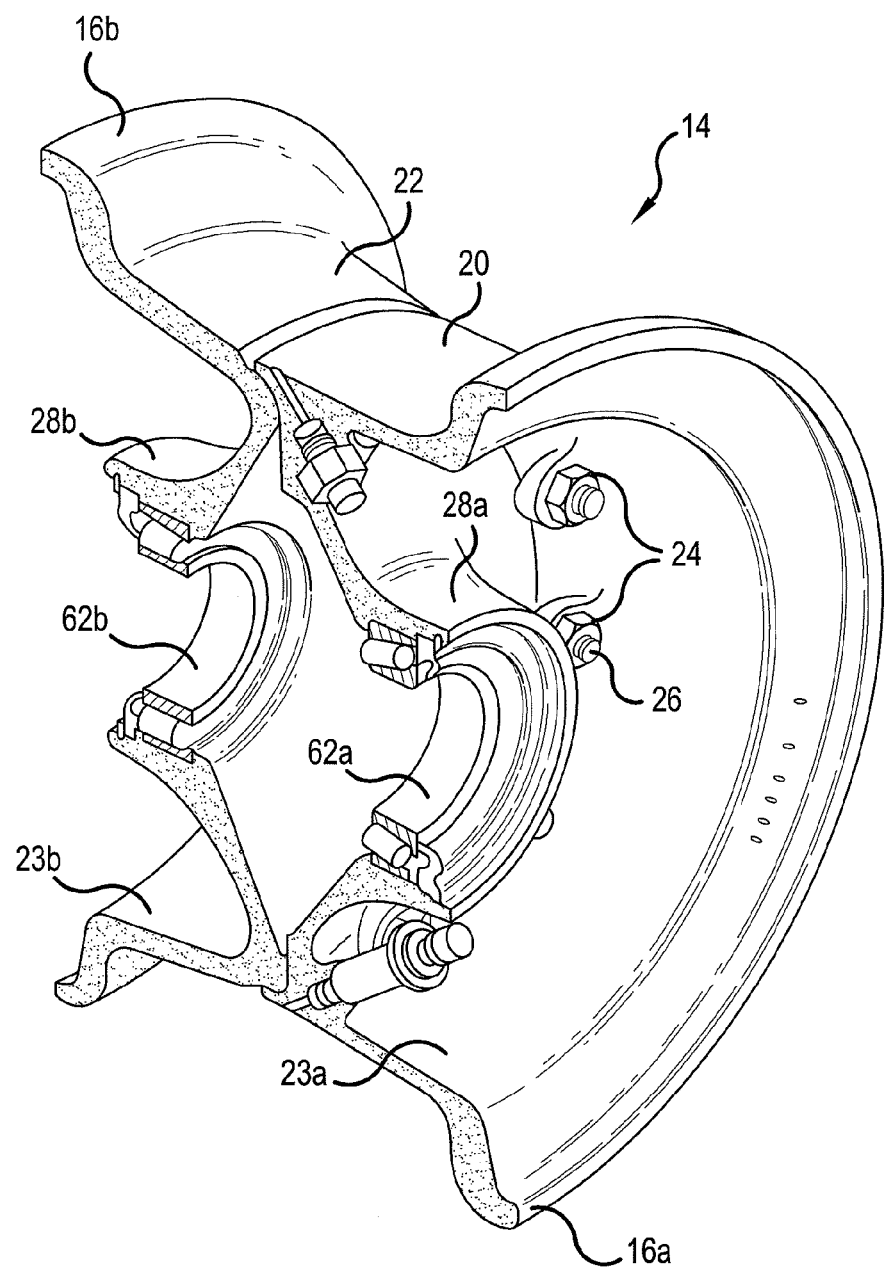
FIG. 2 is a perspective view, partially in section, illustrating the wheel of FIG. 1.

FIG. 2 illustrates an exemplary configuration of a wheel 14, which may be formed by embedding a metal support structure ("skeleton") in a body of fiber-reinforced composite material in accordance with principles of the present invention. With reference to FIG. 2, wheel 14 generally includes first and second wheel halves 20, 22 joined together with by an annular arrangement of tie bolts 26 and nuts 24 in a well-known manner. For purposes of the present discussion, the first and second wheel halves 20, 22 may be considered nearly identical. Those of ordinary skill in the art will appreciate that there may be minor differences between the wheel halves (e.g., the nuts 24 are provided on first wheel half 20, while the heads (not visible in FIG. 2) of tie-bolts 26 are located on the second wheel half 22). First wheel half 20 includes a first (outer) annular region 23a formed from a fiber-reinforced composite material, epoxy or phenolic resin, for example, reinforced with carbon fibers and/or carbon nanofibers. First wheel half 20 future includes a second (inner) annular region 28a, which houses a bearing ring 62a. First wheel half 20 further includes an annular flange region 16a, with which the tire (not shown) can make an airtight seal.

Figure 3:
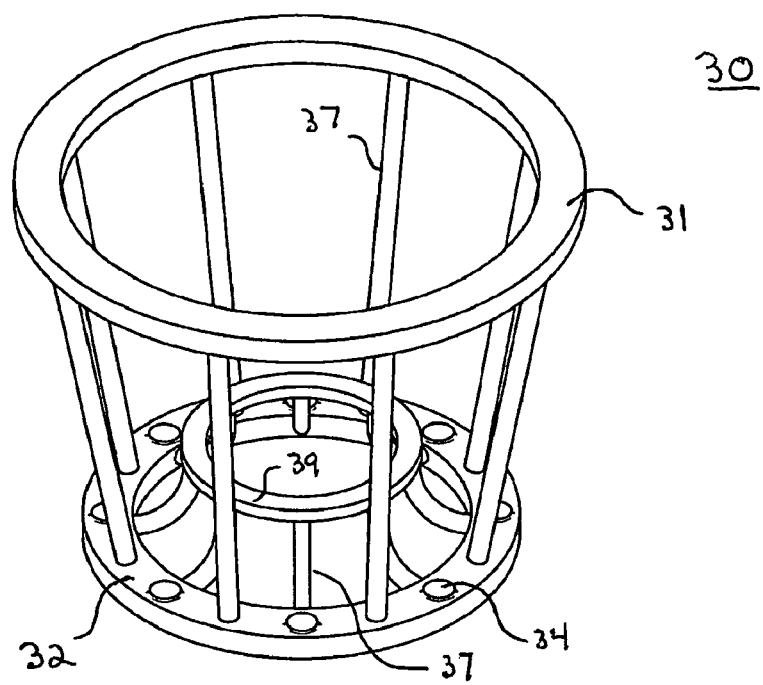
FIG. 3 illustrates a metal support structure, which may be used in accordance with an embodiment of the present invention to form a metal and composite wheel having a configuration illustrated in FIG. 2.

In accordance with an embodiment of the present invention, the first wheel half 20 comprises a support structure 30 as illustrated in FIG. 3, such a support structure 30 being formed of high strength stainless steel or other similar metal or metal alloy and being embedded in a composite material to form a configuration such as that illustrated in FIG. 2. As illustrated in FIG. 3, the support structure 30 includes a flange ring 31, which when embedded in composite material forms the annular flange region 16a of the first wheel half 20. The support structure 30 further includes a tie bolt ring 32, which includes an arrangement of openings 34 for tie-bolts 26. When embedded in composite material, the tie bolt ring 32 forms an annular region for tie-bolt/nut 24 connections between the first and second wheel halves 20, 22. As shown in FIG. 3, the openings 34 are formed through raised regions on the tie-bolt ring 32. In this way the tie-bolt ring 32 includes raised metal regions that, in accordance with an implementation of the present invention, form contact surfaces for nuts 24 (i.e., metal-to-metal contact surfaces) after the support structure is embedded in composite material. In other words, metal contact surfaces on the tie-bolt ring 32 are exposed through composite material in such an implementation for contact with nuts 24.

As shown in FIG. 3, the tie bolt ring 32 is connected to the flange ring 31 with a plurality of metal support rods 37. The tie bolt ring 32 is further connected to an inner support ring 39 by metal support rods 37 to form the second annular region 28a when embedded in the composite material. In one implementation, the inner support ring 39 forms a surface for receiving a bearing ring insert 62a.

Second wheel half 22 is formed in a similar manner, using a support structure like that illustrated in FIG. 3 embedded in composite material to form a first (outer) annular region 23b, a flange region 16b, and a second (inner) annular region 28b, which houses a bearing ring 62b. The tie-bolt ring 32 of the support structure 30 for the second wheel half 22 may include raised metal regions to form a contact surface for metal tie-bolts 26 (or associated washers).

Figure 4:
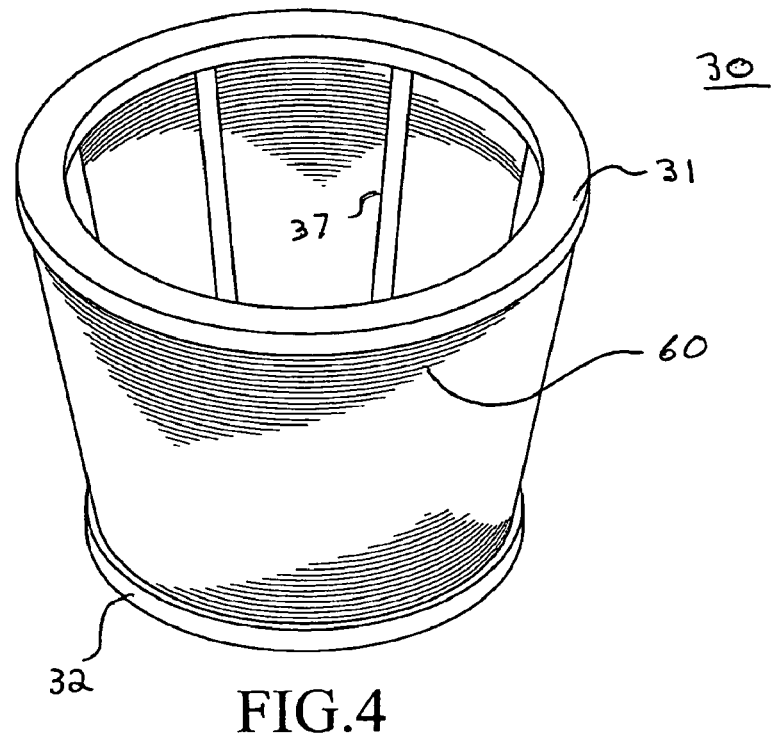
FIG. 4 illustrates a metal support structure wound with reinforcing fibers, which may be used in accordance with an embodiment of the present invention to form a metal and composite wheel having a configuration illustrated in FIG. 2.

Various processes and arrangements can be used to improve strength and bonding between the material forming the annular composite body of the first and second wheel halves 20, 22 and the metal elements of the support structure 30 at least partially embedded therein. For example, reinforcing fibers 60, such as carbon fibers, may be wound around the support rods 37 as illustrated in FIG. 4 before molding the composite material around the metallic support structure 30. Fibers 60 may also be wound around a portion of flange ring 31 illustrated in FIG. 3.

Techniques for improving a metal-to-composite bond may be used when forming first and second wheel halves 20, 22. One such method is disclosed in co-pending patent application Ser. No. 11/730,373, entitled "Bonding of Carbon Fibers to Metal Inserts for Use in Composites," which application is assigned to the assignee of the present application and the entire contents of which are hereby incorporated by reference.

To form first wheel half 20, the support structure 30 is manufactured by connecting (e.g., via welding) the tie bolt ring 32 to flange ring 31 and the inner support ring 39 by metal support rods 37. In one embodiment, the assembled structure is wrapped with fibers 60 as illustrated in FIG. 4 to enhance strength. The resulting support structure 30 may then be placed in a mold (not shown) having the shape of a desired wheel half. Reinforcing fibers (not illustrated) are packed into the mold, and the mold is thereafter filled with a composite material such as epoxy resin which infiltrates the fibers. When the resin has cured, a wheel half 20 having a near net shape is removed from the mold and connected to a second wheel half 22, formed in a similar manner, with tie bolts 26/nuts 24.

The wheel thus formed is lighter than a similarly sized aluminum wheel, yet has the strength required for many aircraft applications. For example, it is anticipated that a wheel 14 described above would be suitable for nose wheel and non-braked main wheel applications for many aircraft. Certain configurations may be suitable for use on a braked main wheel on some aircraft.

The present invention has been described herein in terms of certain preferred embodiments. However, modifications and additions to these embodiments will become apparent to those of ordinary skill in the art upon a reading of the foregoing descriptions. It is intended that all such modifications and additions comprise a part of the present invention to the extent they fall within the scope of the several claims appended hereto.

We claim:

1. An aircraft wheel comprising:
   a first metal support structure comprising a first annular ring and a second annular ring connected via at least one connecting element;
   a first fiber-reinforced, molded composite body, wherein the first metal support structure is at least partially embedded in the first composite body to form a first aircraft wheel section comprising a rim flange for forming a seal with a tire; and
   a second aircraft wheel section formed of a second metal support structure at least partially embedded in a second composite body.

2. The aircraft wheel of claim 1, wherein the first annular ring and the second annular ring are connected via a plurality of metal connecting rods.

3. The aircraft wheel of claim 1, wherein the first annular ring is embedded in the first composite body to form the rim flange and the second annular ring includes openings to form a tie-bolt ring.

4. The aircraft wheel of claim 1, wherein the first metal support structure further includes a third annular ring connected to the second annular ring via at least one connecting element.

5. The aircraft wheel of claim 4, wherein the third annular ring is connected to the second annular ring via a plurality of metal support rods.

6. The aircraft wheel of claim 4, wherein the third annular ring is embedded in the first composite body to form a region for housing a bearing ring.

7. The aircraft wheel of claim 1, wherein the first and second aircraft wheel sections are connected via tie-bolts.

8. The aircraft wheel of claim 1, wherein the first metal support structure is formed from stainless steel.

9. The aircraft wheel of claim 1, wherein the first composite body comprises a composite material comprising at least one of an epoxy resin or a phenolic resin, and wherein the composite material includes carbon reinforcing fibers.

10. The aircraft wheel of claim 9, wherein the carbon reinforcing fibers comprise carbon nanofibers.

11. A method of manufacturing an aircraft wheel, the method comprising:
    embedding, at least partially, a metal support structure in a first fiber-reinforced, molded composite body to form a first aircraft wheel section comprising a rim flange for forming a seal with a tire, wherein the metal support structure comprises a first annular ring and a second annular ring connected via at least one connecting element; and
    embedding, at least partially, a second metal support structure in a second composite body to form a second aircraft wheel section.

12. The method of claim 11, wherein the at least one connecting element comprises a plurality of metal connecting rods, the method further comprising connecting the first annular ring and the second annular ring via a plurality of metal connecting rods.

13. The method of claim 11, wherein embedding the first metal support structure in the first composite body comprises embedding the first annular ring in the first composite body to form the rim flange, wherein the second annular ring includes openings to form a tie-bolt ring.

14. The method of claim 11, further comprising connecting a third annular ring to the second annular ring, via at least one connecting element, to form the first metal support structure.

15. The method of claim 14, wherein connecting the third annular ring to the second annular ring via at least one connecting element comprises connecting the third annular ring to the second annular ring via a plurality of metal support rods.

16. The aircraft wheel of claim 14, further comprising embedding the third annular ring in the first composite body to form a region for housing a bearing ring.

17. The method of claim 11, wherein the first composite body comprises a composite material comprising at least one of an epoxy resin or a phenolic resin, and wherein the composite material includes carbon reinforcing fibers.

18. The method of claim 17, wherein the carbon reinforcing fibers comprise carbon nanofibers.

19. The method of claim 11, further comprising wrapping fiber material around the metal support structure.

20. The method of claim 11, wherein embedding the first metal support structure in the first composite body comprises molding the first composite body around the first metal support structure.

* * * * *